United States Patent
Lee

(12) 
(10) Patent No.: US 6,724,509 B2
(45) Date of Patent: Apr. 20, 2004

(54) OPTICAL SCANNER, LASER IMAGE PROJECTOR ADOPTING THE OPTICAL SCANNER, AND METHOD OF DRIVING THE LASER IMAGE PROJECTOR

(75) Inventor: Jin-ho Lee, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 52 days.

(21) Appl. No.: 10/463,398

(22) Filed: Jun. 18, 2003

(65) Prior Publication Data

US 2003/0210444 A1 Nov. 13, 2003

Related U.S. Application Data

(62) Division of application No. 09/848,332, filed on May 4, 2001.

(30) Foreign Application Priority Data

Nov. 3, 2000 (KR) ............................................ 00-65257

(51) Int. Cl.$^7$ ................................................ G02B 26/08
(52) U.S. Cl. ........................ 359/201; 359/202; 359/198; 359/199; 359/224
(58) Field of Search ................................. 359/198, 199, 359/201–202, 223, 224; 310/309

(56) References Cited

U.S. PATENT DOCUMENTS

| | | |
|---|---|---|
| 5,025,346 A | 6/1991 | Tang et al. |
| 5,097,480 A | 3/1992 | Pease |
| 5,255,082 A | 10/1993 | Tamada |
| 5,536,988 A | 7/1996 | Zhang et al. |
| 5,822,501 A | 10/1998 | Hattori |
| 6,018,408 A | 1/2000 | Hong |
| 6,170,953 B1 | 1/2001 | Lee et al. |
| 6,347,002 B1 * | 2/2002 | Hagelin et al. ............. 359/201 |
| 6,384,952 B1 * | 5/2002 | Clark et al. ................. 359/224 |
| 6,612,029 B2 * | 9/2003 | Behin et al. .................. 29/847 |
| 2002/0021055 A1 | 2/2002 | Lee et al. |

* cited by examiner

Primary Examiner—James Phan
(74) Attorney, Agent, or Firm—Burns, Doane, Swecker & Mathis, L.L.P.

(57) ABSTRACT

An optical scanner, a laser image projector using the optical scanner, and a method of driving the laser image projector are provided. The optical scanner includes: a base substrate; a plurality of parallel stationary comb electrodes arranged on the base substrate extending upwards at right angle; a stage having a mirror side at its top side, being separated a predetermined distance above the base substrate; a plurality of parallel driving comb electrodes arranged on the bottom of the stage extending at right angle interdigitated with the stationary comb electrodes; torsion bars formed at both side edges of the stage with a predetermined length to support such that the stage pivots; and supports for supporting the torsion bars such that the stage is suspended above the base substrate. The laser image projector includes the optical scanners using micro mirrors, instead of a horizontal scanning rotating polygonal mirror and a vertical scanning galvanometer, and is driven such that a single horizontal left-to-right scanning is followed by another right-to-left horizontal scanning without redundant flyback interval. Therefore, comparing with a driving method which needs quick returning 5–10 times faster than horizontal scanning rate, the driving speed can be markedly reduced, so that high-speed driving limitations of optical scanner for high-resolution image display can be overcome.

5 Claims, 7 Drawing Sheets

OPTICAL SCANNER, LASER IMAGE PROJECTOR ADOPTING THE OPTICAL SCANNER, AND METHOD OF DRIVING THE LASER IMAGE PROJECTOR

This application is a continuation divisional of application Ser. No. 09/848.332, filed on May 4. 2001, now pending.

BACKGROUND OF THE INVENTION

1. Field of the Invention

The present invention relates to an optical scanner using micro mirrors based on microelectromechanical system (MEMS) techniques, a laser image projector adopting the optical scanner, and a method of driving the laser image projector, and more particularly, to a multipurpose micro optical scanner, a laser image projector using the optical scanner, which has no limitations in high-speed driving associated with appropriate laser beam scanning onto a screen, and a method for driving the laser image projector.

2. Description of the Related Art

For laser image projectors, a laser beam is scanned in both horizontal and vertical directions to form an image on a screen. For a general NTSC (National Standard System Committee) image signal, a laser beam is scanned horizontally at 15.75 kHz and vertically at 60 Hz. A motion picture consists of 30 image frames per second, and each still image consists of 525 horizontal scan lines (see FIG. 9B). A vertical scanning unit scans once the screen from the top to the bottom while a horizontal scanning unit scans 525 scan lines onto the screen. For the horizontal scanning unit, after horizontal scanning of a single line from the left to the right, there is a need for quickly returning to the left scanning starting point 5–10 times faster than the previous horizontal left-to-right scanning rate so as to prevent light loss.

FIG. 1 shows the structure of an optical system of a conventional laser image projector. A light source 100 is a white-light laser emitting white light. Semiconductor lasers of red (R), green (G), and blue (B) colors, or a wavelength-convertible solid laser may be used as the light source 100. A beam separator 250 separates the white light into R, G, and B monochromic beams. The beam separator 250 includes two dichroic mirrors 670a and 680a, and a high-reflecting mirror 690a. The dichroic mirrors 670a and 680a separate the white light passed through a lens system 220 and an optical path changing high-reflecting mirror 210 into R, G, B beams, and the high-reflecting mirror 690a changes the optical path of the monochromic beam passed through the dichroic mirror 680a. The separated R, G, and B monochromic beams are focused by focusing lenses 640a, 650a, and 660a, are incident on acousto-optic modulators (AOMs) 610, 620, and 630, respectively, and are modulated based upon an image signal. Collimating lenses 640b, 650b, and 660b for collimating the modulated laser beams back into the same parallel beams as those before entering the focusing lenses 640a, 650a, and 660a are disposed next to the AOMs 610, 620, and 630. The R, G, and B beams modulated based upon the image signal are combined into a single combined beam by a beam combinder 650. The beam combinder 650 includes two dichroic mirrors 670b and 680b, and a high-reflecting mirror 690b. The combined beam is incident on a polygonal mirror 800 at an appropriate angle by high-reflecting mirrors 710 and 720. As the combined beam is incident on the polygonal mirror 800 serving as a horizontal scanning unit, the combined beam is horizontally scanned. A horizontal scanning beam passes through relay lenses 310 and 320, which are disposed between the polygonal mirror 800 and a galvanometer 700, and is focused on a mirror side of the galvanometer 700. A laser beam spot focused on the galvanometer 700 is vertically scanned. An image scanned by the polygonal mirror 800 and the galvanometer 700 is projected onto a screen 900 by a reflecting mirror 850 which is disposed above the galvanometer 700 facing the screen 900.

For the conventional laser image projector having the configuration above, the rotating polygonal mirror 800 is used as a horizontal scanning unit. The rotating polygonal mirror 800 is advantageous in that there is no need for quick returning to the initial scanning point described above. However, the polygonal mirror 800 is mechanically rotated, so that there are limitations in increasing the scanning rate and reducing the size. Thus, a small laser television (TV) cannot be implemented with the polygonal mirror 800. For this reason, a micro optical scanner having a structure of MEMS-technique based microactuator has been suggested as a horizontal scanning unit for a small laser TV. However, unlike a mechanical rotational driving method, for a general galvanometer driving method, a return (or flyback) period 5–10 times shorter than a single horizontal line scanning period is required. However, it is very difficult to manufacture a micro optical scanner which satisfies the need for such quick returning.

U.S. Pat. No. 5,025,346 discloses a micro actuator using the electrostatic effect by comb electrodes. This micro actuator includes movable comb electrodes formed on a movable structure, and stationary comb electrodes formed on a stationary structure, wherein the movable and stationary comb electrodes are, alternately arranged. The movable structure is suspended by neighboring supports. This suspension structure oscillates at a horizontal resonant frequency.

For an x-y axial driving, i.e., along two or more axises, more electrodes are required for a driving unit. For example, the driving unit includes at least three electrodes for an one-axial and unidirectional driving, and at least five electrodes for an one-axial and bidirectional driving. U.S. Pat. No. 5,536,988 discloses a multiaxial driving micro actuator as a driving unit having a plurality of electrodes, which is formed in selective areas of a silicon substrate by a thermal-oxidation insulating method.

The conventional micro actuator includes parallel driving comb electrodes formed along the edge of a movable stage or structure, and parallel stationary comb electrodes fixed on a stationary stage. The stationary comb electrodes and the driving comb electrodes are alternately arranged facing each other.

The conventional micro actuators having the configurations have comb electrodes around the edge of the stages, so that the size of the entire microactuating system is enlarged with respect to the stages or movable structure, thereby limiting the applications thereof.

SUMMARY OF THE INVENTION

It is a first object of the present invention to provide a miniature optical scanner in which the structure of comb electrodes is efficiently designed.

It is a second object of the present invention to provide a multipurpose optical scanner capable of linear or 2-dimensional scanning.

It is a third object of the present invention to provide a laser image projector adopting the optical scanner having a micro mirror and a method of driving the laser image projector, in which the scanning direction of a horizontal scan line is alternately changed to eliminate a redundant flyback period, so that correct image reproduction can be achieved at a relatively low driving speed.

To achieve the first and second objects of the present invention, there is provided an optical scanner comprising: a base substrate; a plurality of parallel stationary comb electrodes arranged on the base substrate extending upwards at right angle; a stage having a mirror side at its top side, being separated a predetermined distance above the base substrate; a plurality of parallel driving comb electrodes arranged on the bottom of the stage extending at right angle interdigitated with the stationary comb electrodes; torsion bars formed at both side edges of the stage with a predetermined length to support such that the stage pivots; and supports for supporting the torsion bars such that the stage is suspended above the base substrate.

In another embodiment, there is provided an optical scanner comprising: a first optical scanner having a reflecting side from which an incident beam is reflected in a first direction within the range of a predetermined angle; and a second optical scanner for scanning a laser beam scanned by the first optical scanner in the first direction, in a second direction perpendicular to the first direction, wherein each of the first and second optical scanners comprises: a base substrate; a plurality of parallel stationary comb electrodes arranged on the base substrate extending upwards at right angle; a stage having a mirror side at its top side, being separated a predetermined distance above the base substrate; a plurality of parallel driving comb electrodes arranged on the bottom of the stage extending at right angle interdigitated with the stationary comb electrodes; torsion bars formed at both side edges of the stage with a predetermined length to support such that the stage pivots; and supports for supporting the torsion bars such that the stage is suspended above the base substrate.

According to an aspect of the third object of the present invention, there is provided a laser image projector comprising: a light source for emitting a white light beam; a beam separating unit for separating the white light beam into three main monochromic beams; an acousto-optic modulating unit for modulating the three main monochromic beams based on color signals; a beam combining unit for combing the monochromic beams modulated by the acousto-optic modulating unit into a single combined beam; and a laser scanning unit for scanning the single beam combined with the monochromic beams to form an image, wherein the laser scanning unit comprises a horizontal scanning mirror for horizontally scanning the single combined beam, and a vertical scanning mirror for vertically scanning a beam incident from the horizontal scanning mirror.

In the laser image projector, it is preferable that the laser scanning unit comprises a first optical scanner having the horizontal scanning mirror and a second optical scanner having the vertical scanning mirror, wherein each of the first and second optical scanners comprises: a base substrate; a plurality of parallel stationary comb electrodes arranged on the base substrate extending upwards at right angle; a stage having a mirror side at its top side, being separated a predetermined distance above the base substrate; a plurality of parallel driving comb electrodes arranged on the bottom of the stage extending at right angle interdigitated with the stationary comb electrodes; torsion bars formed at both side edges of the stage with a predetermined length to support such that the stage pivots; and supports for supporting the torsion bars such that the stage is suspended above the base substrate.

It is preferable that the horizontal scanning mirror horizontally scans the single beam combined with the monochromic beams alternately from the left to the right and from the right to the left. It is preferable that the laser scanning unit further comprises a memory for temporarily storing an image information horizontally scanned from the right to the left.

According to another aspect of the third object of the present invention, there is provided a method of driving a laser image projector including: a light source for emitting a white light beam; a beam separating unit for separating the white light beam into three main monochromic beams; an acousto-optic modulating unit for modulating the three main monochromic beams based on color signals; a beam combining unit for combing the monochromic beams modulated by the acousto-optic modulating unit into a single combined beam; and a laser scanning unit for scanning the single beam combined with the monochromic beams to form an image, the method comprising alternately horizontally scanning the single beam combined with the modulated monochromic beams from the left to the right and from the right to the left.

It is preferable that an image signal scanned in opposite directions to an input image signal in the alternate horizontal scanning from the left to the right and from the right to the left is temporarily stored in a memory and is output in the reverse order such that a correct image can be displayed.

BRIEF DESCRIPTION OF THE DRAWINGS

The above objects and advantages of the present invention will become more apparent by describing in detail preferred embodiments thereof with reference to the attached drawings in which:

FIG. 9A shows a conventional horizontal scan signal, and FIG. 9B shows the scanning direction onto a screen depending on the horizontal scan signal of FIG. 9A; FIG. 10A shows a horizontal scan signal, and FIG. 10B shows the scanning direction onto a screen depending on the horizontal scan signal of FIG. 10A.

DETAILED DESCRIPTION OF THE INVENTION

Figure 1:
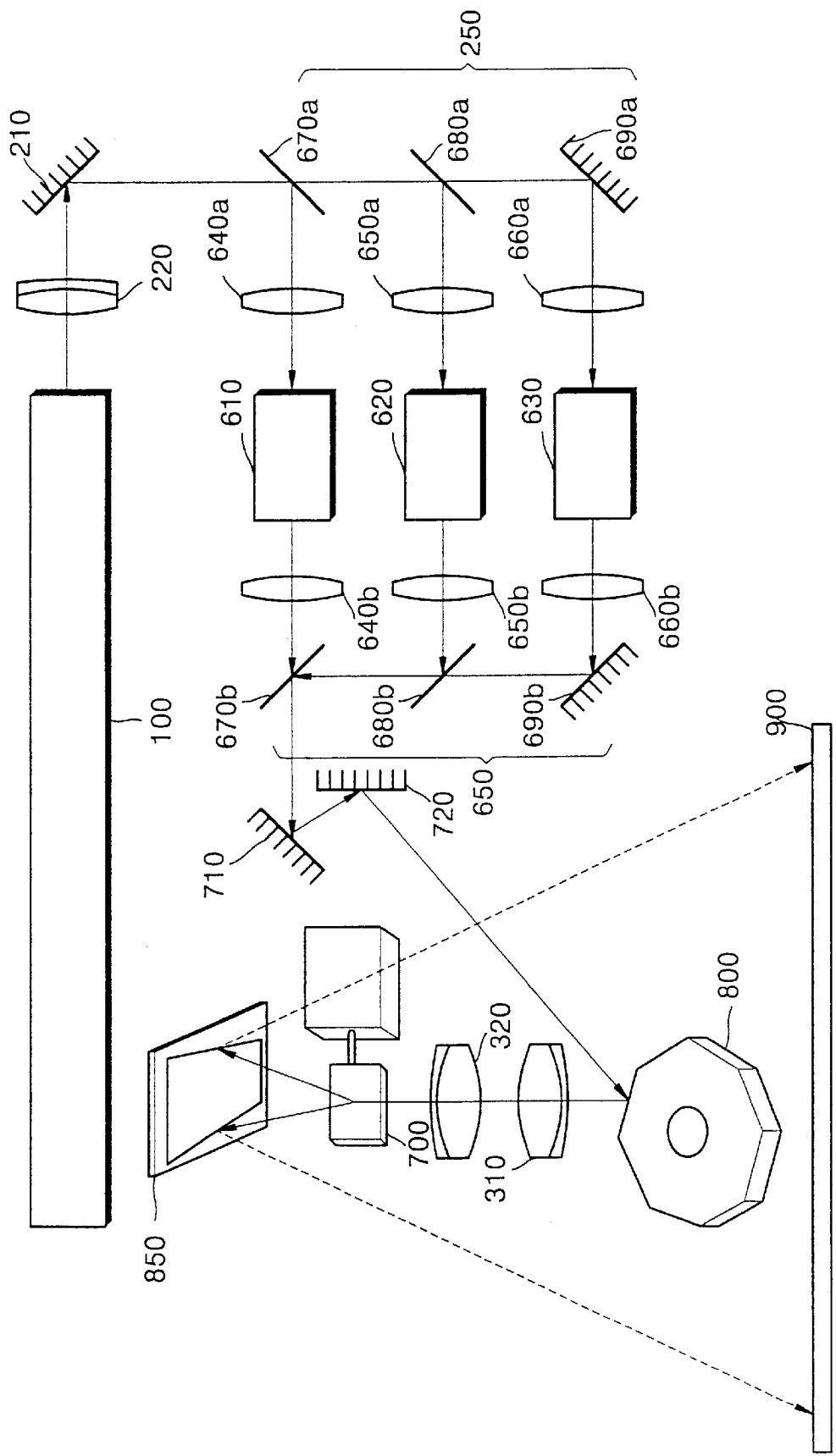
FIG. 1 is a schematic view of a conventional laser image projector.
Figure 2:
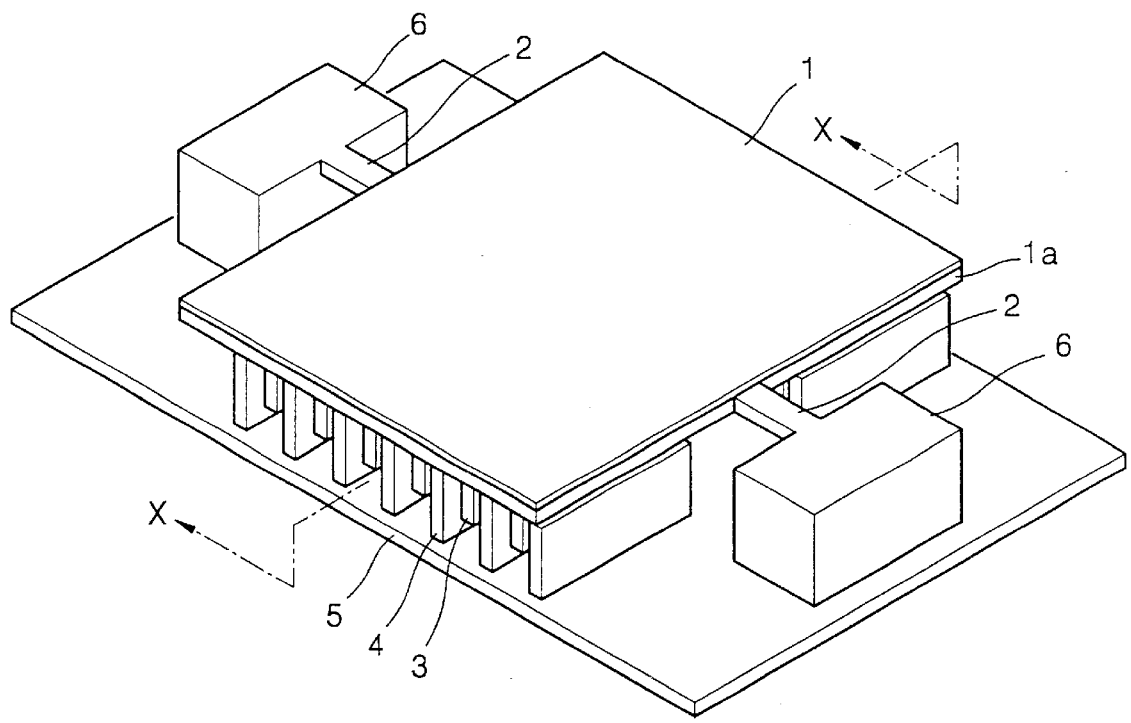
FIG. 2 is a perspective view of a preferred embodiment of an optical scanner according to the present invention.
Figure 3:
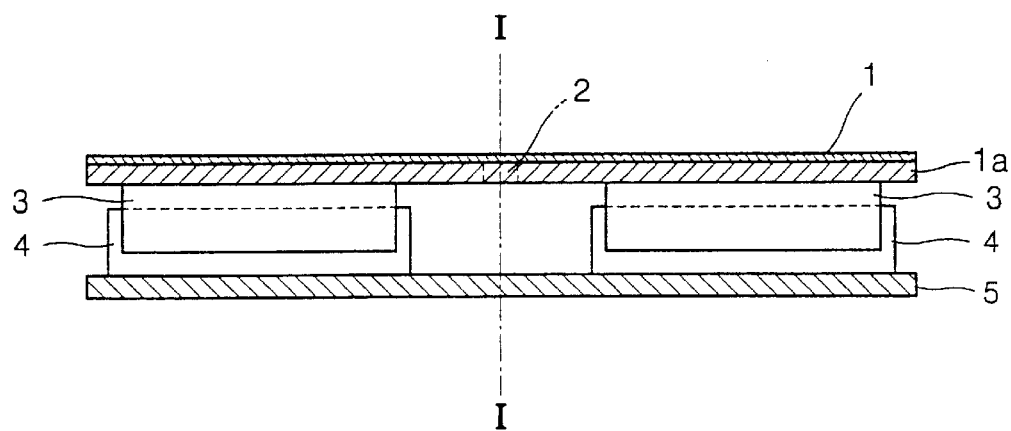
FIG. 3 is a sectional view of the optical scanner according to the present invention taken along line X—X of FIG. 2.

A preferred embodiment of an optical scanner according to the present invention is shown in FIGS. 2 and 3. Referring to FIG. 2, a stage 1a is suspended by supports 2 above a substrate 5 made of, for example, pyrex glass. Here, the both sides of the stage 1a is supported by the supports 2. Torsion bars 2 are located in the middle of the sides of the stage 1a and support the stage 1 such that the stage 1 can pivot like a seesaw. The torsion bars 2 are connected to the supports 6.

As shown in FIG. 3, the top of the stage 1a is formed by a mirror side 1. A plurality of parallel driving comb electrodes 3 are formed on the bottom of the stage 1a to have a predetermined height. The plurality of driving comb electrodes 3 are divided into two groups by line I—I.

On the other hand, a plurality of parallel stationary comb electrodes 4 are formed on the top of the substrate 5 to have a predetermined height, which are perpendicular to the driving comb electrodes 3. The plurality of stationary comb electrode 3 are also divided into two groups by line I—I aligned with the driving comb electrodes 3.

In the optical scanner having the configuration, the stage 1a oscillates by electrostatic force exerted between the driving comb electrodes 3 and the stationary comb electrodes 4 which are divided by line I—I. For example, if an attractive force acts between the driving comb electrodes 3 and the stationary comb electrodes 4 arranged on the left of line I—I, the stage 1 a rotates to the left. Meanwhile, if an attractive force acts between the driving comb electrodes 3 and the stationary comb electrodes 4 arranged on the right of line I—I, the stage 1arotates to the right. The stage 1a returns to its original position by self-restoring force based on the elastic modulus of the torsion bars 2. The electrostatic force is induced with alternate applications of voltage to the left and right sides, so that the stage 1a oscillates.

In FIGS. 2 and 3, a wiring layer for supplying an electric signal to the driving comb electrodes 2 and the stationary comb electrodes 4 is not illustrated. The main wiring layer for the driving comb electrodes 3 and the stationary comb electrodes 4 is formed in the substrate 5. An electric signal for the driving comb electrodes 3 is supplied by the wiring layer formed on the substrate 5, the supports 6, and the stage 1a. The wiring layer can be easily formed by a common technique, and thus description of the wiring layer formation will not be provided here.

Figure 4:
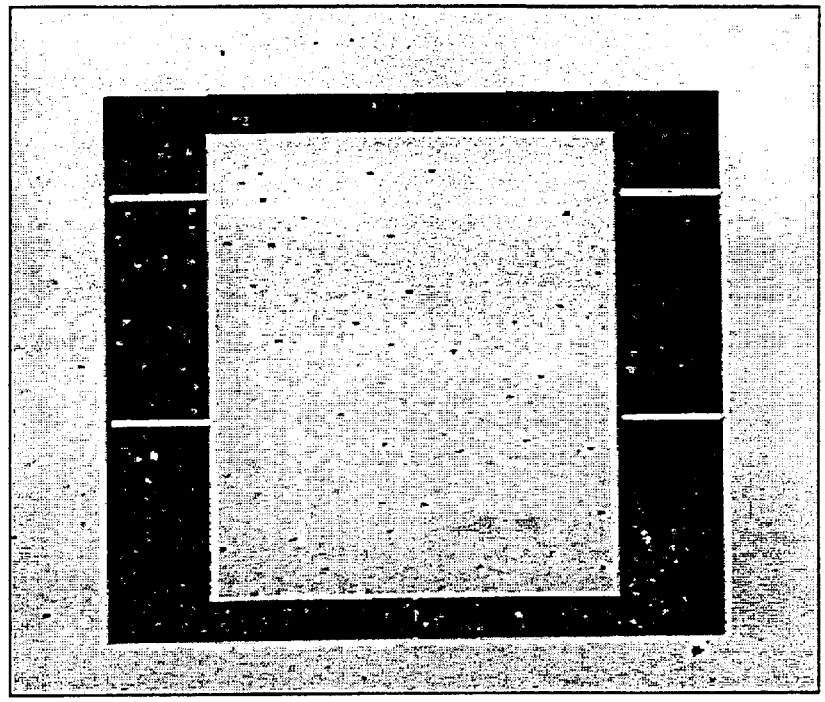
FIG. 4 is a photograph of an actual optical scanner according to the present invention.
Figure 5:
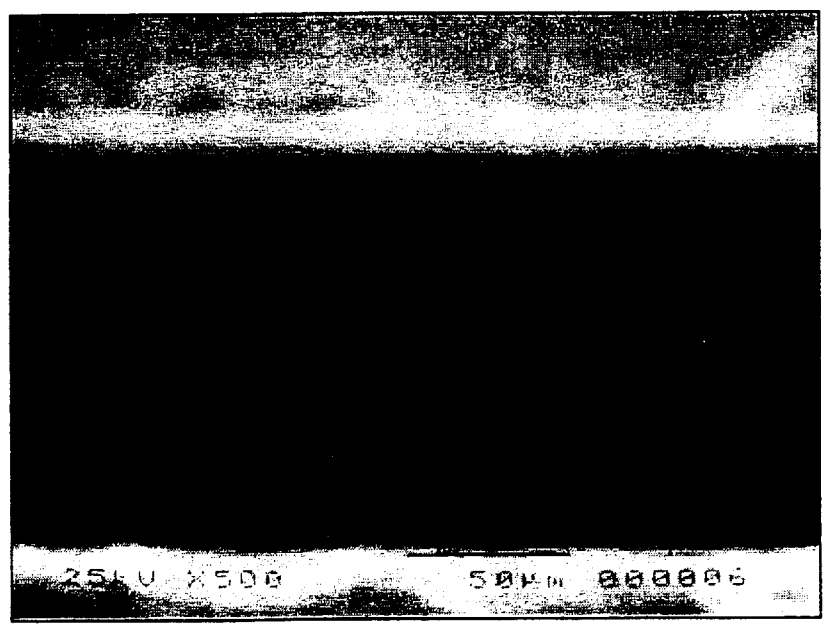
FIG. 5 is a photograph of an actual optical scanner according to the present invention, which shows the arrangement of driving comb electrodes on the bottom of a stage and of stationary comb electrodes on the top of a substrate.
Figure 6:
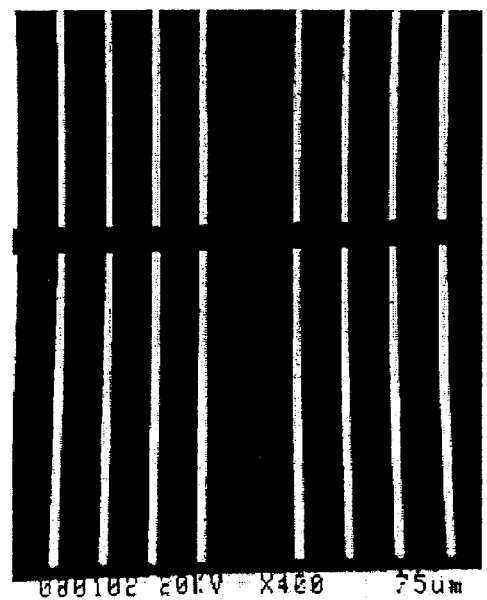
FIG. 6 is a photograph of an actual optical scanner according to the present invention, which shows the stationary comb electrodes are divided into two groups on the substrate.

FIG. 4 is a photograph of an actual optical scanner according to the present invention, which is manufactured as a sample. FIG. 5 is a photograph of the arrangement of the driving comb electrodes 3 formed on the bottom of the stage 1a and the stationary comb electrodes 4 formed on the top of the substrate 5. FIG. 6 is a photograph of the arrangement of the stationary comb electrodes 4 formed on the substrate 5, in which the stationary comb electrodes 4 are divided into two groups, as described previously. This divided structure is also shown for the driving comb electrodes 3 formed on the bottom of the stage 1a.

The optical scanner having the configuration described above can be used for multiple purposes. For example, a single or a plurality of optical scanners can be applied to a laser image projector according to the present invention, which will be described later, a laser printer which needs linear laser beam scanning, and a bar code reader. For linear scanning, one optical scanner is adopted. For 2-dimensional planar scanning, at least two optical scanners are used. In this case where an apparatus employs two optical scanners, one of the optical scanners scans a laser beam in the x-direction, and the other optical scanner performs scanning in the y-direction with the beam scanned in the x-direction. Therefore, an image can be displayed by scanning a planar screen with laser beam, or a linear light signal can be obtained from an image of an object scanned.

Figure 7:
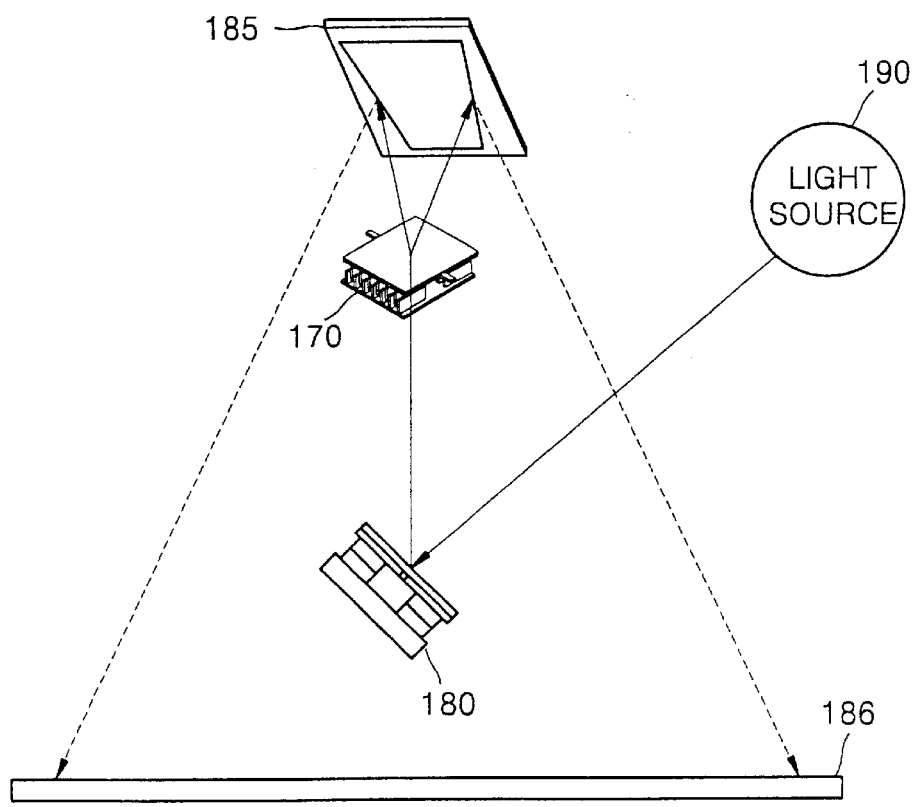
FIG. 7 is a schematic view of another preferred embodiment of the optical scanner, which adopts two optical scanner units of FIG. 2.

FIG. 7 is a schematic view of a multipurpose 2-dimensional optical scanner adopting two optical scanner units according to another preferred embodiment of the present invention. Referring to FIG. 7, a first optical scanner 180 for scanning a light beam in a first direction is located forward of a light source 190 which emits a light beam in a constant direction. The first optical scanner 180 reflects the beam incident from the light source 190 in the x-direction within the range of a predetermined angle. A second optical scanner 170 is located on the travelling path of the reflected beam from the first optical scanner 180 to reflect the beam reflected by the first optical scanner 180 in the y-direction perpendicular to the x-direction.

A reflecting mirror 185 is disposed on the travelling path of the reflected beam from the second optical scanner 170. An image screen 186 on which the light beam is finally incident is located on the travelling path of beam reflected from the reflecting mirror 185. Alternatively, the image screen 186 may be located in the position of the reflecting mirror 185. In this case, the reflecting mirror 185 is not mounted.

Although the optical scanner of FIG. 7 is illustrated as structure in which a planar image is formed using the point light source, the optical scanner may be constructed in the reverse structure. In particular, the image screen 186 may be an object to be scanned and the light source 190 may be replaced with a photodetector. In this case, the optical scanner acts as an image scanner for reading an image of the object as a linear electrical signal. This image scanner may be used as a general image scanner for generating a computer image file from a photograph, or as a bar code reader for reading product bar codes. In other words, for the optical scanner according to the present invention having the configuration shown in FIG. 7, the beam travelling direction can be changed depending on the purpose of use and appropriate optical elements can be disposed at the ends of the beam travelling path of the optical scanner according to the changes.

Hereinafter, a preferred embodiment of a laser image projector according to the present invention, which adopts two optical scanners having the configuration described above, will be described in greater detail. In the laser image projector according to the preset invention, a laser scanning unit (LSU) using micro mirror continues to scan along horizontal scan lines by alternately changing the scanning direction without need for flyback interval. As a result, normal image reproduction can be implemented with the optical scanner having a relatively low scanning rate. To this end, an image signal scanned in the opposite direction is stored in a buffer memory and is output in the reverse order to display the correct image. The structure of the laser image projector according to the present invention will be described below in detail.

Figure 8:
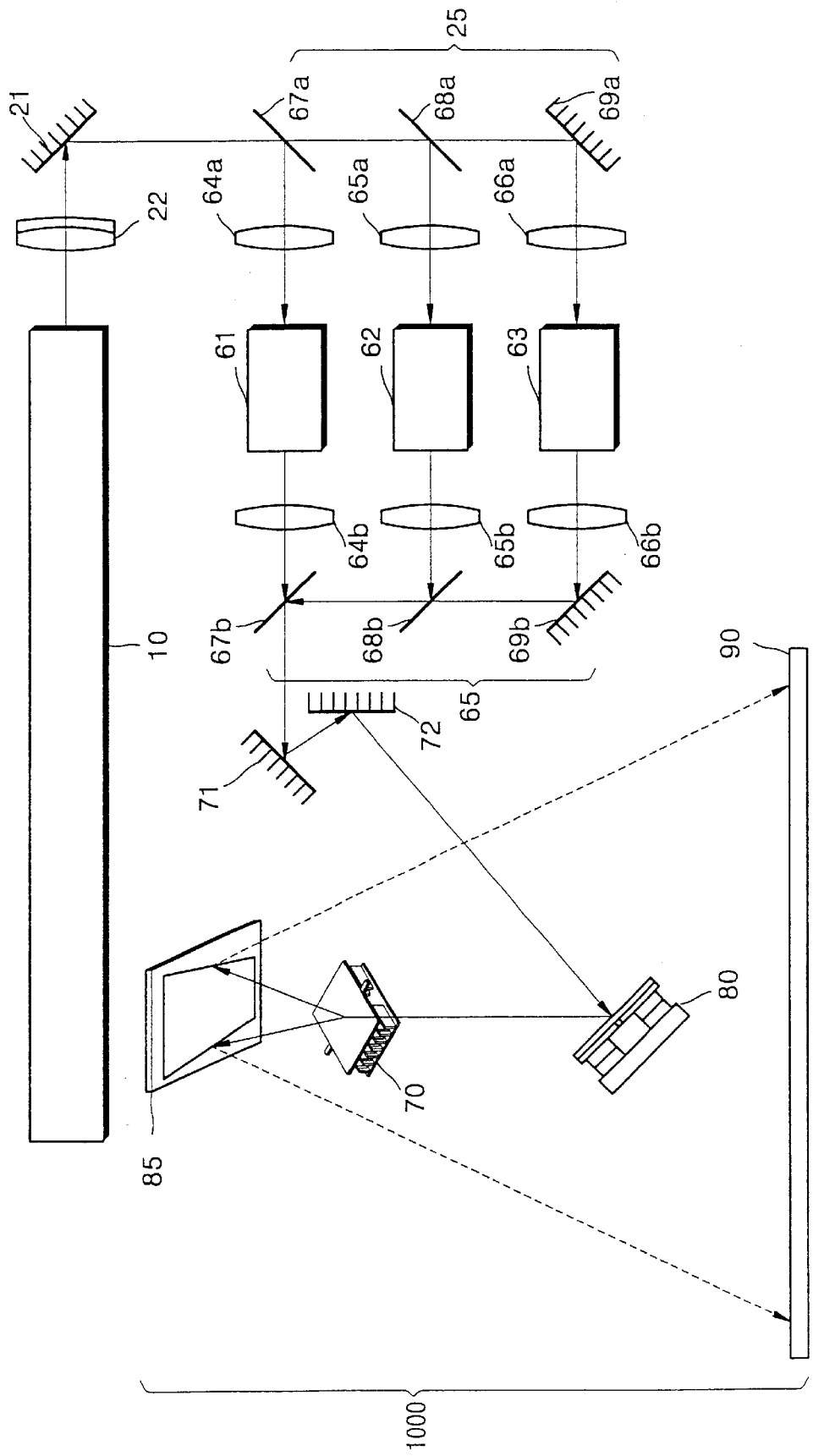
FIG. 8 is a schematic view of a laser image projector according to the present invention having optical scanners with micro mirrors.

FIG. 8 shows the optical structure of a laser image projector according to the present invention having optical scanners with micro mirrors. Referring to FIG. 8, a light source 10 is a white-light laser emitting white light. Semiconductor laser devices of red (R), green (G), and blue (B) colors, or a wavelength-convertible laser may be used as the light source 10. A beam separator 25 separates the white light passed through a lens system 22 and an optical path changing mirror 21 into R, G, and B monochromic beams. The beam separator 25 includes two dichroic mirrors 67a and 68a, and a high-reflecting mirror 69a. The dichroic mirrors 67a and 68a separate the white light into R, G, B beams, and the high-reflecting mirror 69a changes the optical path of the monochromic beam passed through the dichroic mirror 68*a*. The separated R, G, and B monochromic beams are focused by focusing lenses 64*a*, 65*a*, and 66*a*, are incident on acousto-optic modulators (AOMs) 61, 62, and 63, respectively, and are modulated based upon an image signal. Collimating lenses 64*b*, 65*b*, and 66*b*, for collimating the modulated laser beams back into the same parallel beams as those before entering the focusing lenses 64*a*, 65*a*, and 66*a*, are disposed next to the AOMs 61, 62, and 63. The R, G, and B beams modulated based upon the image signal are combined into a single combined beam by a beam combinder 65. The beam combinder 65 includes two dichroic mirrors 67*b* and 68*b*, and a high-reflecting mirror 69*b*. The combined beam is incident on a horizontal scanning mirror 80 of a laser scanning unit (LSU) 1000 which is a feature element of the present invention. In particular, the combined beam is incident on the horizontal scanning mirror 80 of the LSU 1000, and is horizontally scanned. The horizontal scanning beam is focused on a mirror side of a vertical scanning mirror 70 of the LSU 1000 and is vertically scanned. An image scanned by the horizontal and vertical scanning mirrors 80 and 70 is projected onto a screen 90 by a reflecting mirror 85 which is disposed above the vertical scanning mirror 70.

The LSU 1000 including the horizontal scanning mirror 80, the vertical scanning mirror 70, and the reflecting mirror 85 is manufactured as a micro structure using microelectromechanical system (MEMS)-techniques. A MEMS-technique based optical scanner has the structure described with reference to FIGS. 2 through 6. Thus, the LSU 1000 includes the optical scanners whose structure has been described previously. In particular, the vertical scanning mirror 70 and the horizontal scanning mirror 80 are formed as separate optical scanners. The functions of the vertical scanning mirror 70 and the horizontal scanning mirror 80 are performed by the mirror side 1 of the stage 1*a* of the optical scanner described previously.

The ultimate goal of the present invention is to implement a laser TV receiver by reducing the size of a laser image projector therefor using such micro optical scanners. By replacing the polygonal mirror and galvanometer which serve as the conventional LSUs with two miniature optical scanners having micro mirrors with application of a driving method suitable for high-speed image process, it is possible to implement a high-quality laser TV.

Figure 9A:
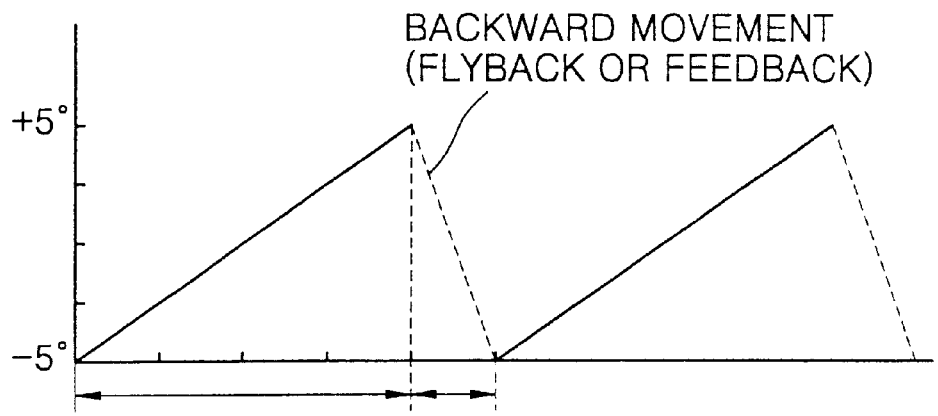
FIGS. 9A and 9B illustrate a conventional horizontal scanning method, and in particular.
Figure 9B:
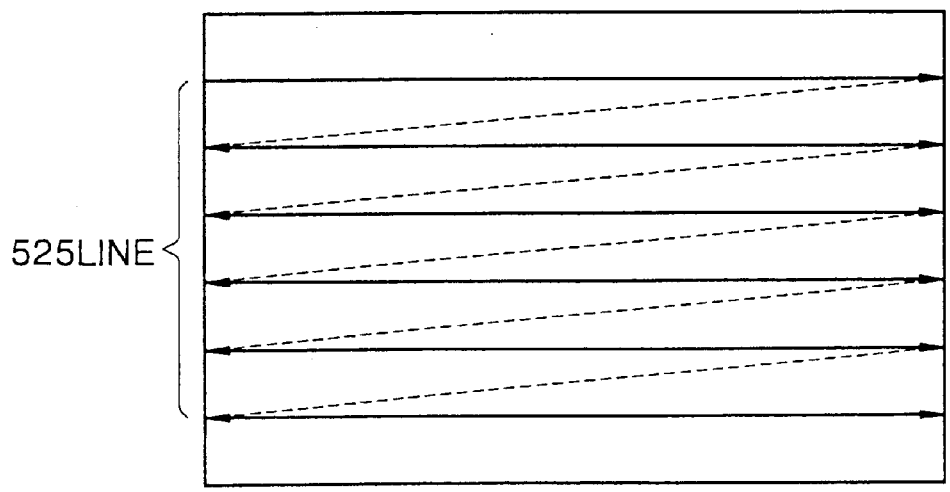
Figure 10A:
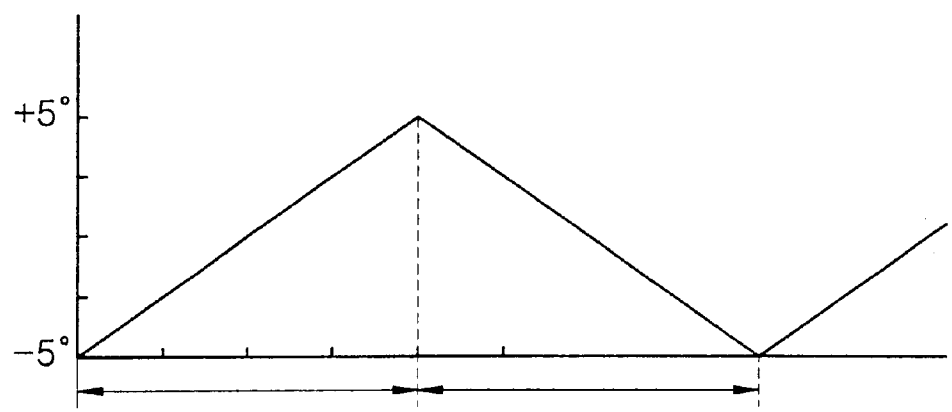
FIGS. 10A and 10B illustrate a horizontal scanning method according to the present invention, and in particular.
Figure 10B:
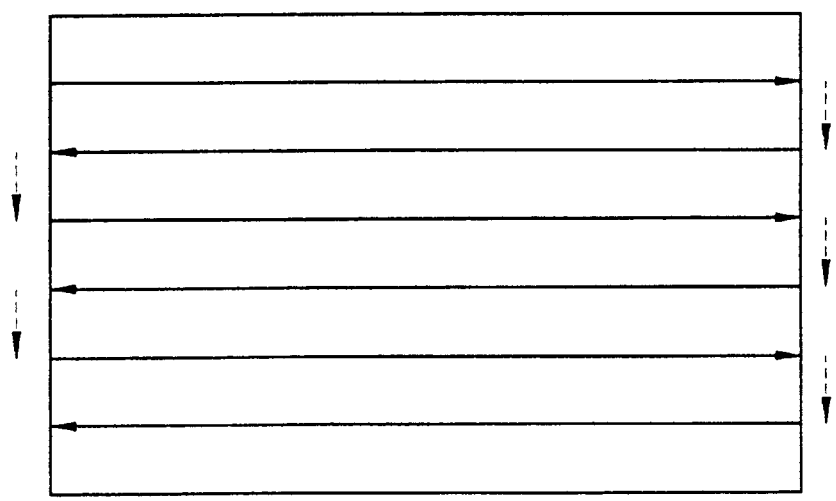

A method of driving the laser image projector according to the present invention will be described with reference to FIGS. 10A and 10B in comparison with the conventional driving method illustrated in FIGS. 9A and 9B. FIGS. 9A and 10A show a conventional horizontal scan signal and a horizontal scan signal according to the present invention, respectively. FIGS. 9B and 10B show the scanning directions of laser beam onto a screen according to the conventional horizontal scan signal and the horizontal scan signal according to the present invention, respectively. For the conventional horizontal scan signal, in the solid line interval of the horizontal scan signal, as shown in FIG. 9A, a single horizontal line denoted by a solid line in FIG. 9B is scanned from the left to the right. After the single line scanning, in the dashed line interval of FIG. 9A, the laser beam returns to the initial scanning starting position, toward the left, 5–10 times faster than the left-to-right horizontal scanning rate, along a dashed line of FIG. 9B. The conventional driving method displays an image by sequentially repeating the left-to-right horizontal scanning and the right-to-left horizontal flyback movement. For the conventional driving method, high-speed horizontal scanning is required for high-resolution image display. However, there is a limitation of increasing scanning rate with the optical scanner.

On the contrary, for the laser image projector according to the present invention in which the micro horizontal scanning mirror is used instead of the polygonal mirror serving as a conventional horizontal scanning unit for miniaturization purpose, the micro horizontal scanning mirror operates based on the horizontal scan signal illustrated in FIG. 10A. As shown in FIG. 10A, this horizontal scan signal has no flyback interval as illustrated with only solid lines. The present invention is characterized in that continuous horizontal scanning without flyback interval is possible. Thus, as shown in FIG. 10B, on the basis of the horizontal scan signal of FIG. 10A, a single left-to-right horizontal scanning is followed by another right-to-left horizontal scanning. The entire of an image is realized by repeating the left-to-right horizontal scanning and the right-to-left horizontal scanning, the entire of an image is realized. According to the driving method of the present invention, the horizontal scanning can be continuously performed without the redundant flyback interval which is inevitable for the conventional driving method. Thus, although the scanning rate of micro mirror of the laser image projector according to the present invention is lower than the conventional scanning unit, the correct image can be realized. In other words, when the scanning manner illustrated in FIG. 10B is applied to the micro optical scanner according to the present invention, there is no need for quick returning to the initial scanning starting position (flyback mode), so that the correct image can be displayed with high-resolution beyond the limitation associated with high-speed driving of optical scanner. In the present invention, a line of the image scanned from the right to the left is opposite to the original input image signal, so that the transmitted image signal is stored in a buffer memory and is output in the reverse order to display the correct image. According to the present invention, the driving method which needs no flyback interval following a single horizontal scanning is applied to the micro optical scanner, so that satisfactory image display can be implemented even at relatively low driving speed.

As previously described, the optical scanner according to the present invention is characterized in terms of its miniature structure, so that its applications can be extended. The laser image projector according to the present invention includes the optical scanners using micro mirrors, instead of the horizontal scanning rotating polygonal mirror and the vertical scanning galvanometer, and is driven such that a single horizontal left-to-right scanning is followed by another right-to-left horizontal scanning without redundant flyback interval. Therefore, comparing with the conventional driving method which needs quick returning 5–10 times faster than horizontal scanning rate, the driving speed can be markedly reduced, so that high-speed driving limitations of optical scanner for high-resolution image display can be overcome. In addition, the left-right balanced driving manner contributes to preventing damage of the optical scanner with improved reliability.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical scanner comprising:

a base substrate;

a plurality of parallel stationary comb electrodes arranged on the base substrate extending upwards at right angle;

a stage having a mirror side at its top side, being separated a predetermined distance above the base substrate;

a plurality of parallel driving comb electrodes arranged on the bottom of the stage extending at right angle interdigitated with the stationary comb electrodes;

torsion bars formed at both side edges of the stage with a predetermined length to support such that the stage pivots; and supports for supporting the torsion bars such that the stage is suspended above the base substrate.

2. An optical scanner comprising:

a first optical scanner having a reflecting side from which an incident beam is reflected in a first direction within the range of a predetermined angle; and a second optical scanner for scanning a laser beam scanned by the first optical scanner in the first direction, in a second direction perpendicular to the first direction, wherein each of the first and second optical scanners comprises:

a base substrate;

a plurality of parallel stationary comb electrodes arranged on the base substrate extending upwards at right angle;

a stage having a mirror side at its top side, being separated a predetermined distance above the base substrate;

a plurality of parallel driving comb electrodes arranged on the bottom of the stage extending at right angle interdigitated with the stationary comb electrodes;

torsion bars formed at both side edges of the stage with a predetermined length to support such that the stage pivots; and supports for supporting the torsion bars such that the stage is suspended above the base substrate.

3. The optical scanner of claim 2, wherein a light source for emitting a beam onto the first optical scanner is disposed forward of the first optical scanner, and an image screen is disposed on the traveling path of a beam reflected from the second optical scanner.

4. The optical scanner of claim 3, wherein a reflecting mirror for reflecting a beam from the second optical scanner toward the image screen is disposed between the second optical scanner and the image screen.

5. The optical scanner of claim 2, wherein a photodetector is disposed at the end of the optical path close to the first optical scanner, and an object to be scanned is located at the other end of the optical path close to the second optical scanner.

* * * * *